July 30, 1963 P. D. FRELICH 3,099,832

DOPPLER NAVIGATION SYSTEM

Filed Nov. 4, 1959 2 Sheets-Sheet 1

INVENTOR
PAUL D. FRELICH
BY H. Vincent Harsha
ATTORNEY

INVENTOR
PAUL D. FRELICH
BY H. Vincent Harsha
ATTORNEY

United States Patent Office 3,099,832

Patented July 30, 1963

1

3,099,832
DOPPLER NAVIGATION SYSTEM

Paul D. Frelich, Wellesley, Mass., assignor to Raytheon Company, Waltham, Mass., a corporation of Delaware Filed Nov. 4, 1959, Ser. No. 850,960
8 Claims. (Cl. 343—8)

This invention relates to Doppler navigation systems and, more particularly, to a Doppler system for indicating the sign and magnitude of a velocity vector with simple means coupled thereto for determining distance traveled in the direction of said vector.

Several Doppler navigation systems are currently in use on military and civilian aircraft. These systems include radar transmitting and receiving equipment and detect the Doppler shift of transmitted radar signals which reflect from the terrain below the craft. Other Doppler navigation systems employed for nautical navigation use sonar transmitting and receiving equipment and detect the Doppler shift of sound waves which reflect from the ocean bottom. The principles of operation in both these systems are often the same and the differences in structures employed are not necessitated by different operating principles, but rather by differences in frequency, propagation velocity, craft velocity and techniques for detecting and transmitting. Therefore, the new Doppler navigation system described in this invention is applicable in principle where radar or sonar transmitting and receiving systems are employed and, thus, is useful for aircraft navigation and nautical or underwater navigation.

In some prior Doppler navigation systems a Doppler frequency signal obtained by mixing transmitted frequency with received frequency is fed to digital circuits and therein transformed into a digital number representative of the Doppler frequency shift or craft velocity. One disadvantage of such prior systems employing mixing devices producing Doppler frequency shift is that only velocity magnitude is obtained directly, and velocity sign must be obtained in some other manner.

In some cases it is desirable to detect craft velocity in each of perpendicular directions such as north and east for energizing a two dimensional display such as a plotting board which includes a pointer driven in two directions by motors which are energized by signals proportional to the craft velocity in the chosen directions. Such systems are quite simple and efficient, and the motors serve a two-fold purpose. First, they serve to integrate the signals representing velocity yielding mechanical outputs representing craft position, and secondly they provide the mechanical drive for animating the display. In such prior systems, Doppler shift frequency, representing velocity, is obtained from a mixing device which mixes transmitted with received frequency, and a frequency signal which varies with said Doppler shift frequency is applied to a synchronous motor. The speed of this motor is representative of velocity and serves to drive the display. One limitation of such a system is that only the velocity magnitude is obtained, and the sign of velocity must be obtained in some other manner.

It is a principal object of this invention to provide a Doppler navigation system having none of the abovementioned limitations of the prior systems.

It is another object to provide a navigation system, including Doppler frequency detection means, for determining the sign and magnitude of craft velocity.

It is another object to provide a simple system for detecting a craft velocity relative to the earth in at least four directions and driving a display showing craft position.

It is another object to provide means including wave transmitting and receiving devices for energizing synchronous motors which drive a display at rates representative of the sign and magnitude of craft velocity indicating craft position relative to an initial position or a reference position.

2

It is a feature of this invention to employ wave energy transmitting and receiving means on a craft and a plurality of synchronous motors with means coupling said transmitting and receiving means to different ones of said motors whereby the rate of one motor is representative of transmitted frequency, and the rate of another motor is representative of received frequency and differential means driven by said motors producing a motion representative of the sign and magnitude of craft velocity.

It is another feature of the present invention to employ frequency dividers for coupling said transmitting and receiving means to said motors whereby transmitted frequency is divided by the same amount as received frequency.

It is a feature of one embodiment of this invention to divide transmitted frequency in a given manner and apply the resulting signal to one synchronous motor, to divide received frequency in the same manner applying the results to another synchronous motor, to drive a differential device with the outputs from said motors and to count differential output turns, thereby determining the distance traveled by said craft.

It is a feature of another embodiment of this invention to provide wave energy transmitting and receiving means for directing and receiving reflected energy in two different directions which are perpendicular to each other (the frequency transmitted in each direction being the same) at least three synchronous motors, identical frequency dividing means coupling each receiver to a different synchronous motor and coupling said transmitter to another synchronous motor, at least two differentials both driven by the motor coupled to the transmitter and each also driven by a different one of the other motors, and a two dimensional display driven by said differentials.

Other features and objects of this invention will be more apparent from the following specific description taken in conjunction with the drawings in which:

FIG. 3 depicts a simple method for coupling transmitter and receiver to their respective motors suitable in some cases, particularly where sonar is employed.

Figure 1:
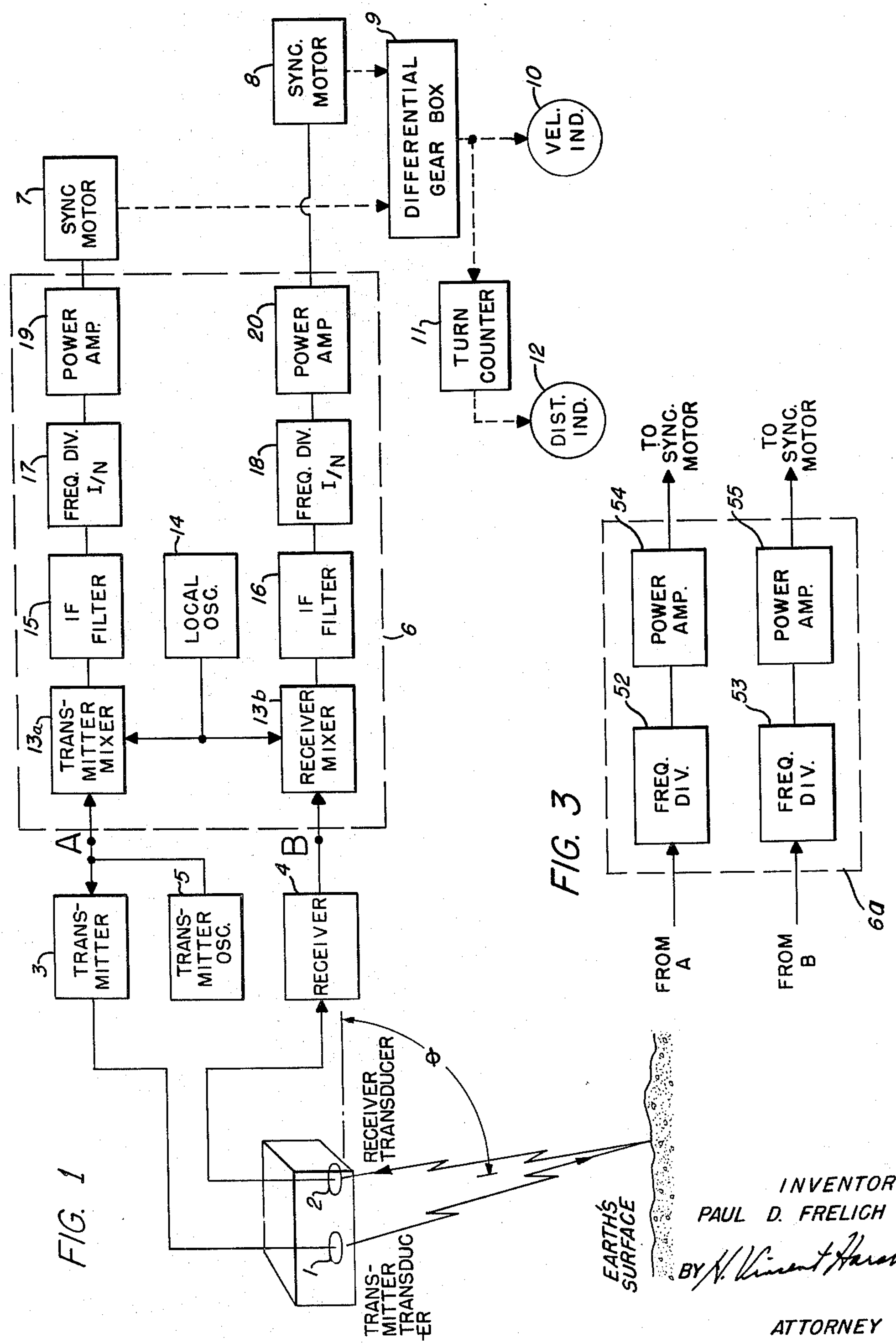
FIG. 1 depicts a system for detecting and indicating craft velocity and distance in one direction relative to the earth.

If the transmitted frequency for transmitting radar energy or sonar energy, as the case may be, is denoted $F_t$ and the frequency of energy reflected from the terrain below the craft is denoted $F_d$, then $F_d$ is related to $F_t$ as follows:

$$F_d = F_t\left(\frac{c+v\cos\theta}{c-v\cos\theta}\right) \qquad (1)$$

In Equation 1, $c$ represents the wave propagation of the energy, $v$ is the craft velocity in the direction of the transmitted and reflected energy, while $\theta$ is the angle between the direction of transmitted energy and the horizontal, commonly called the deflection angle. As a rule, $v$ is much less than $c$. Where radar is employed, $c$ is the speed of light or 186,000 m.p.s. and where sonar is employed $c$ is the speed of propagation of sound in water or about 2,840 knots. Consequently, for either application Equation 1 may be written with negligible error as follows:

$$F_d = F_t\left(i + 2\frac{v}{c}\cos\theta\right) \text{ when } v \ll c \qquad (2)$$

In both the transmitted and received frequency $F_t$ and $F_d$ are beat against a local oscillator frequency denoted herein as $F_{lo}$, intermediate frequencies are produced. These intermediate frequencies, $IF_t$ and $IF_d$, are set forth in Equations 3 and 4 below:

$$IF_t = F_{lo} - F_t \quad (3)$$

$$IF_d = F_{lo} - F_d \quad (4)$$

The IF frequncies can be divided by the factor N to produce suitable frequencies denoted $f_t$ and $f_d$, respectively, for energizing similar synchronous motors so that the shaft speeds of these motors are proportional to the IF frequencies and are linear functions of the transmitted and received frequenies. Consequently, the motor speeds denoted $S_t$ and $S_d$ are related to $f_t$ and $f_d$ by the same constant of proportionality, denoted $k$ and can be represented as follows:

$$S_t = kf_t \quad (5)$$

$$S_d = kf_d \quad (6)$$

If the motors drive a differential gear and the output shaft speed of the differential gear is deonted $S_o$; then $S_o$ is related to $S_t$ and $S_d$ or $F_t$ and $F_d$ as follows:

$$S_o = \frac{S_t - S_d}{2} = \frac{k}{2}\frac{(F_d - F_t)}{N} \quad (7)$$

Obviously, $S_o$ is a shaft rotation rate which is directed proportional to the difference between transmitted frequency and received frequency and, consequently, is proportional to craft velocity. Equation 2 can be substituted in Equation 7 to yield an expression for $S_o$ in terms of transmitted frequency $F_t$, craft velocity $v$, propagation speed $c$, division factor N, deflection angle $\theta$ and constant $k$. This expression is as follows:

$$S_o = \frac{kF_t v \cos \theta_d}{Nc} \quad (8)$$

It will be noted from Equation 8 that the final shaft speed proportional to craft velocity is independent of local oscillator frequency. Consequently, in one embodiment of the invention, preferably employing sonar transmitting and receiving equipment on a nautical craft transmitting at 210 kc., $F_{lo}$ the local oscillator frequency may be made zero. For example, at a forward speed of 40 knots, $f_d$ would be approximately 98.5 c.p.s. if N were $13^3$ and if $k$ were unity, $S_o$ would be .95 r.p.m. which is quite suitable for driving a velocity indicator.

Turning to FIG. 1 there is shown one embodiment of this invention whereby craft velocity over the earth's surface in a given direction may be detected and indicated, the indication denoting sign as well as magnitude of the velocity. There is shown transducer devices 1 and 2 for propagating wave energy and receiving the reflected wave energy from the ground, respectively. Transducer 1 is coupled to and energized by transmitter 3, while transducer 2 feeds signals to receiver 4, The frequency of transmitter 3 is controlled by transmitter oscillator 5. The output of transmitter oscillator 5 and receiver 4 at junctions A and B, respectively, are fed to coupling circuit 6 which may consist of different components depending upon the type of energy flowing through said transducers and the magnitude of the Doppler shift of received energy. Coupling circuit 6 serves to couple the signals from junction A and B to synchronous motors 7 and 8, respectively, so that the shaft speed of motor 7 is proportional to the frequency output of transmitter oscillator 5 and the shaft speed of motor 8 is proportional to the frequency of the signal received by receiver 4 from transducer 2. The shaft outputs from motors 7 and 8 are coupled to differential gear box 9, and the output shaft of differential gear box 9 drives velocity indicator 10. Since the speed of motor 7 is proportional to transmitted frequency and the speed of motor 8 is proportional to received frequency, the difference in speeds is proportional to Doppler frequency shift as set forth in Equation 7 and represented as $S_o$. This shaft output from the differential gear box is, thus, proportional to velocity as shown by Equation 8. Consequently, by counting the number of turns of a shaft output from gear box 9 an indication of distance traveled can be had. For this purpose turn counter 11 is coupled to the output of differential 9 and drives a distance indicator 12.

Referring again to coupling circuit 6 in FIG. 1 there is shown one suitable structure for this circuit adaptable in principle to sonar or radar systems. This coupling circuit might, for example, consist of transmitter mixer 13*a* and receiver mixer 13*b* receiving inputs from the terminals A and B, respectively, and from local oscillator 14. These mixers perform the functions indicated by Equations 3 and 4. The output from mixers 13*a* and 13*b* are applied to similar IF filters 15 and 16, respectively, which pass only a single sideband of the frequencies mixed by their associated mixers. The single sideband signals from filters 15 and 16 are applied to frequency dividers 17 and 18, respectively, each of which divides frequency signals fed thereto by the factor N. The frequency divider circuits might, for example, be digital counters each composed of N stages. The outputs from frequency dividers 17 and 18 consisting of pulses are applied to power amplifiers 19 and 20 which amplify the energy, remove higher frequencies therefrom and yield substantially sign wave signals of the same frequency as the pulse rates from their associated frequency dividers. Amplifiers 19 and 20 in turn energize synchronized motors 7 and 8, respectively.

It is apparent in view of the above description of coupling circuit 6 that the frequency difference between signals at terminals A and B is made substantially more significant by mixing each of those signals with local oscillator frequency yielding two IF frequencies of considerably smaller magnitude but differing by the same amount as the frequency signals at A and B. These IF frequencies are then divided as required to make them suitable for energizing synchronous motors so that the difference between motor speeds is proportional to the difference between transmitted and received frequencies.

Figure 2:
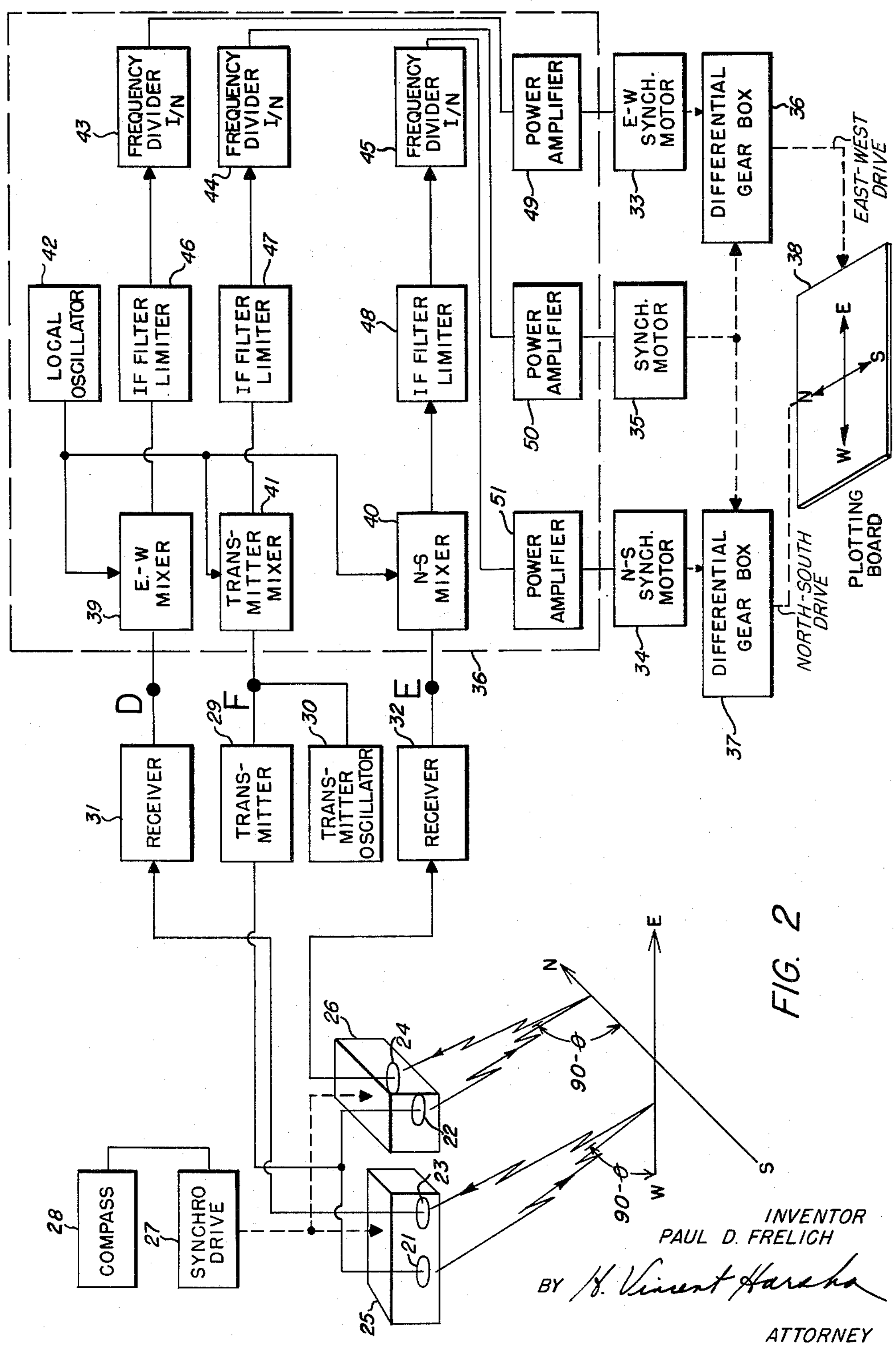
FIG. 2 depicts a similar system for detecting and indicating craft velocity and position relative to the earth in two directions perpendicular to each other.

Turning next to FIG. 2 there is shown another embodiment of this invention including means for transmitting and receiving wave energy in two different directions which are perpendicular to each other so as to obtain two Doppler shifts representing a craft's velocity in perpendicular directions relative to the terrain below. This system might, for example, consist of transmitting transducers 21 and 22 transmitting wave energy in directions perpendicular to each other denoted, for example, north and east. Similar receiving transducers 23 and 24 are provided for receiving wave energy transmitted from transducers 21 and 22, respectively, and reflected from the terrain below. The pair of transducers 21 and 23 and the pair 22 and 24 are shown contained separately in structures 25 and 26, and these structures are driven in rotation by synchro drive 27 which is coupled and slaved to compass 28. As a result of this coupling, the energy directed from transmitting transducer 21 is always in an easterly direction, and the energy transmitted from transmitting transducer 22 is always directed in a northerly direction and, consequently, the velocity of the craft equipped with such a system may be readily obtained in two dimensions.

Transmitting transducers 21 and 22 may, for example, be energized from the same source, such as transmitter 29 whose frequency is controlled by transmitter oscillator 30, while the signals from receiving transducers 23 and 24 are applied to separate receivers 31 and 32. The outputs of receivers 31 and 32 and transmitter oscillator 30 at junctions D, E and F, respectively, are coupled to synchronous motors 33, 34 and 35, respectively, by a suitable coupling circuit 36 such that the speeds of these motors are representative of the frequencies of received and transmitted signals. The shaft speed of motor 33 is representative of the received frequency from the easterly direction, while the speed of motor 34 is representative of the received frequency from the northerly direction, and the speed of motor 35 represents the frequency of transmitted frequency in both these directions. Consequently, the difference between the speeds of motors 33 and 35 represents the velocity of the craft in the easterly direction, while the difference between speeds of motors 34 and 35 represents the velocity of the craft in the northerly direction. These speed differences are obtained by employing differential gear boxes 36 and 37 driven by motors 33 and 34, respectively and each also driven by motor 35 as shown in the figure. The shaft outputs from these differential gear boxes may serve as the drive mechanism for a two dimensional plotting board 38 on which is plotted the position of the craft relative to its initial position or relative to a reference point. Obviously, in the case of the east-west drive applied to the plotting board, when the speed of motor 35 is less than the speed of motor 33 the drive will be towards the east; when the speed of motor 33 is less than the speed of motor 35 the drive will be towards the west. This same principle of operation applys to north-south drive applied to the plotting board responding to the speeds of motors 34 and 35.

Referring again to coupling circuit 36 in FIG. 2, this might, for example, consist of three mixers 39, 40 and 41 receiving signals from terminals D, E and F, respectively, and mixing those signals with the signal from local oscillator 42. The output of mixers 39, 40 and 41 are applied to similar frequency dividers 43, 44 and 45 via filters 46, 47 and 48 which pass only a single sideband of the signals from their associated mixers and limit the single sideband signals producing square waves suitable for triggering the frequency dividers. Frequency dividers 43, 44 and 45 are preferably digital counters having the same number of stages and produce pulse outputs at rates $1/N$ times the signal rates from their associated filters. These outputs from dividers 43, 44 and 45 are applied to power amplifiers 49, 50 and 51, respectively, which serve to amplify the energy therefrom and remove higher frequencies yielding, essentially, sign waves of the same frequency as pulse rates from the dividers. Amplifiers 49, 50 and 51 in turn energize synchronous motors 33, 34 and 35.

The principles of operation of the systems shown in FIG. 2 are essentially the same as the system shown in FIG. 1 and includes two systems such as shown in FIG. 1 combined in a most advantageous manner to eliminate duplication of equipment.

Turning next to FIG. 3 there is shown an alternate coupling circuit *6a* for use in place of the coupling circuit 6 shown in FIG. 1 where the frequency of the transmitted signal and the magnitude of Doppler shift are suitable and allow elimination of the local oscillator, such as already outlined above. Coupling circuit *6a* might, for example, consist merely of frequency dividers 52 and 53, responsive to signals from junctions A and B of FIG. 1. The output of frequency dividers 52 and 53 are applied to power amplifiers 54 and 55 which may be similar to amplifiers 19 and 20 of FIG. 1 which energizes synchronized motors such as shown and already described with reference to FIG. 1.

While there is described above the principles of this operation as represented by different embodiments for one-dimensional and two-dimensional representations of craft velocity, it is to be understood that these are made only by way of example and that other devices could be substituted therein for energizing the motor means so that motor speeds represent transmitted and received frequencies and for obtaining the differential between motor speeds which is representative of velocity without deviating from the spirit or scope of the invention as set forth in the claims.

What is claimed is:

1. A Doppler navigation system for detecting craft velocity relative to a surface comprising means on said craft for directing wave energy in two different directions toward said surface, means for detecting reflection from each of said different directions, a source of wave energy coupled to said energy directing means, receiver means coupled to each of said energy detecting means, first, second and third motor means, means coupling said source of wave energy to said first motor means, means coupling said receiver means to said second and third motor means whereby the rate of said first motor means is representative of the frequency of directed energy and the rate of each of said second and third motor means is representative of the frequency of detected energy from a different of said directions, first and second differential means driven by said first and second and said first and third motor means respectively producing output motions representative of the sign and magnitude of craft velocity in said different directions.

2. A Doppler navigation system as in claim 1 including further first, second and third frequency dividing means coupled to said transmitting and receiving means, and means coupling a different one of said motor means to each of said frequency dividing means.

3. A system as in claim 1 wherein each of said differential outputs is a rotational motion and different rotation counting and indicating means is coupled to each of said differential means for indicating the sign and magnitude of distance traveled by said craft in each of said different directions.

4. A Doppler navigation system for detecting the sign and magnitude of craft velocity relative to the earth comprising means on said craft for directing wave energy toward the earth in different directions and means on said craft for detecting said wave energy reflected from said different directions, transmitter means coupled to said directing means, separate receiving means coupled to each of said detecting means, separate mixing means coupled to said transmitter and each of said receiver means, a source of reference signal, means coupling said source of reference signal to each of said mixing means, a plurality of synchronous motors, frequency dividing means coupling each of said mixing means to a different one of said synchronous motors and first and second differential gear means each mechanically coupled to a different pair of said synchronous motors, whereby the output shaft rotation of said first and second differential gear means is directly proportional to the velocity of said craft in different of said directions.

5. A Doppler navigation system for detecting the sign and magnitude of craft velocity relative to the earth comprising means on said craft for directing wave energy toward the earth in two fixed directions and means on said craft for detecting said wave energy reflected from said different directions, transmitter means coupled to said directing means, separate receiving means coupled to each of said detecting means, separate mixing means coupled to said transmitter and each of said receiver means, a local oscillator, means coupling said local oscillator to each of said mixing means whereby each of said detected waves from fixed directions and the output of said transmitter means are mixed with the output of said local oscillator producing first, second and third frequency difference signals, first, second and third synchronous motors, first, second and third frequency dividing means coupling said first, second and third frequency difference signals to said first, second and third synchronous motors, respectively, and first and second differential gear means mechanically coupled to said first and second and said second and third synchronous motors, respectively, whereby the output shaft rotation of said first and second differential gear means is directly proportional to the velocity of said craft in different of said fixed directions.

6. In a Doppler navigation system including means on a craft transmitting wave energy in different fixed directions, means detecting said wave energy reflected from said different directions, a transmitter energizing said directing means and separate receiving means coupled to each of said wave detecting means, means coupled to said transmitting and receiving means for producing signals representative of the sense and magnitude of said craft velocity relative to said fixed directions comprising separate mixing means coupled to each of said receiving and transmitting means, a source of reference signal, means coupling said source of reference signal to each of said mixing means, a difference synchronous motor associated with each of said receiving means and said transmitting means, means coupling the output of each of said mixing means with its associated synchronous motor, different differential gear means associated with each of said fixed directions each coupled to a different of said synchronous motors associated with a receiver and each also coupled to said synchronous motor associated with said transmitter, whereby the output of each of said differential gear means is representative of the sense and magnitude of said craft velocity in different of said fixed directions.

7. In a Doppler navigation system including means on a craft transmitting wave energy in different fixed directions, means detecting said wave energy reflected from said different directions, a transmitter energizing said directing means with a given frequency signal and separate receiving means coupled to each of said wave detecting means, means coupled to said transmitting and receiving means for producing signals representative of the sense and magnitude of said craft velocity relative to said fixed directions comprising separate mixing means coupled to each of said receiving means and said transmitting means, means coupling a reference signal to each of said mixing means, a different synchronous motor associated with each of said receiving means and said transmitting means, different frequency dividing means coupling the output of each of said mixing means with its associated synchronous motor, different differential gear means associated with each of said directions each coupled to a different of said synchronous motors associated with a receiver and each also coupled to said synchronous motor associated with said transmitter, whereby the output of each of said differential gear means is representative of the sense and magnitude of said craft velocity in different of said fixed directions.

8. In a Doppler navigation system including means on a craft transmitting wave energy in two fixed directions, means detecting said wave energy reflected from said different fixed directions, a transmitter energizing said directing means with a given frequency signal and separate receiving means coupled to each of said wave detecting means, means coupled to said transmitting and receiving means for producing signals representative of the sense and magnitude of said craft velocity in said two fixed directions comprising separate mixing means coupled to each of said receiving means and said transmitting means, a local oscillator, means coupling said local oscillator to each of said mixing means, different synchronous motors associated with each of said receiving means and said transmitting means, separate means dividing frequency by a factor N coupling the output of each of said mixing means with its associated synchronous motor, different differential gear means associated with each of said fixed directions each coupled to a different synchronous motor associated with a different receiver and each also coupled to said synchronous motor associated with said transmitter, whereby the output rate of each of said differential gear means is directly proportional to the sense and magnitude of said craft velocity in said associated direction and said given frequency and inversely proportional to said factor N.

References Cited in the file of this patent

UNITED STATES PATENTS

| | | |
|---|---|---|
| 2,429,427 | Rieber | Oct. 21, 1947 |
| 2,865,019 | Harrison | Dec. 16, 1958 |